(12) United States Patent
Skartland

(10) Patent No.: US 12,150,571 B2
(45) Date of Patent: Nov. 26, 2024

(54) FOOD COOLING APPARATUS

(71) Applicant: Bianca Skartland, Nashville, TN (US)

(72) Inventor: Bianca Skartland, Nashville, TN (US)

(*) Notice: Subject to any disclaimer, the term of this patent is extended or adjusted under 35 U.S.C. 154(b) by 672 days.

(21) Appl. No.: 17/145,340

(22) Filed: Jan. 10, 2021

(65) Prior Publication Data

US 2021/0235906 A1 Aug. 5, 2021

Related U.S. Application Data

(63) Continuation-in-part of application No. 16/927,222, filed on Jul. 13, 2020, now abandoned.

(60) Provisional application No. 62/995,532, filed on Jan. 31, 2020.

(51) Int. Cl.
| | |
|---|---|
| *A47G 19/00* | (2006.01) |
| *A23L 3/00* | (2006.01) |
| *A23L 3/36* | (2006.01) |
| *A47G 21/00* | (2006.01) |
| *A47K 10/48* | (2006.01) |
| *F26B 19/00* | (2006.01) |

(52) U.S. Cl.
CPC ............. *A47G 19/00* (2013.01); *A23L 3/001* (2013.01); *A23L 3/363* (2013.01); *A47G 21/007* (2013.01); *A47K 10/48* (2013.01); *F26B 19/00* (2013.01); *A23V 2002/00* (2013.01)

(58) Field of Classification Search
CPC ........... F24F 1/01; F24F 13/26; F24F 2221/28
USPC ......................................................... 454/236
See application file for complete search history.

(56) References Cited

U.S. PATENT DOCUMENTS

| | | | |
|---|---|---|---|
| 8,926,739 B2* | 1/2015 | Morgan .................... | E03F 5/08 96/111 |
| 10,184,495 B2* | 1/2019 | Iyer ...................... | F04D 29/5826 |
| 2019/0113215 A1* | 4/2019 | Coleman ............. | F21V 23/0471 |

* cited by examiner

*Primary Examiner* — Allen R. B. Schult

(57) ABSTRACT

A food cooling apparatus, including a generally pear shaped housing having a bottom portion connected to a middle portion tapering to a top portion, an electric fan connected to an interior wall of the housing and operative to draw air into an air inlet and out an air outlet, and a rechargeable battery supported within the bottom portion. A connector portion configured to attach to an external surface extends downward from the bottom portion. The housing has a generally hollow interior with the air inlet located on the middle portion or bottom portion and the air outlet located on the top portion. The air outlet is generally perpendicular to the housing in an upright position. The electric fan is not visible from the outside of the generally pear shaped housing. The rechargeable battery operationally provides power to the electric fan. The lower portion has a greater mass than the middle and top portions such that the center of gravity of the housing is lowered.

19 Claims, 6 Drawing Sheets

FOOD COOLING APPARATUS

CROSS REFERENCE TO RELATED APPLICATIONS

The present application is a continuation-in-part of and claims priority to U.S. patent application Ser. No. 16/927,222, entitled "Baby-Safe Drying Apparatus," filed in the U.S. Patent and Trademark Office on Jul. 13, 2020, and claims priority to U.S. patent provisional application Ser. No. 62/995,532, entitled "Adjustable Fan Tool, Cooling Tool Set, and Educational Training System," filed in the U.S. Patent and Trademark Office on Jan. 31, 2020, each having at least one common inventor as the present document and hereby incorporated by reference.

BACKGROUND OF THE INVENTION

Field of the Invention

The present invention is generally related to personal dryers and fans, and more particularly to a food cooling apparatus.

Discussion of the Background

One problem associated with portable fans and hair dryers is that one hand must be used at all times to hold and support the device while in operation. Such an arrangement is problematic because there are many instances where a user may need to be hands-free or use both hands. Fans and hair dryers known in the prior art tend be handheld or stationary. They are not configured to be easily adjustable in the hand to direct airflow as needed to the smaller spaces such as a kitchen or other eating area. Having a device that allows safe operation in a handheld and handsfree configuration is beneficial. Another problem is that the blades used in such devices are often not safe and certainly not designed to operate in close proximity to a user.

Conventional food cooling apparatus known in the prior art include micro-fans attached spoons and chopsticks. Such food cooling apparatus bring the micro-fans and the hot foods dangerously near the face and hair of the user. Further, such food cooling apparatus only cool small amounts of foods at time and require the user to turn the device on and off or the fan will continue to blow near the user's face. Additionally, food cooling apparatus known in the prior art lack the ability to easily attach and detach the food cooling apparatus to any external surface near the article intended to be cooled. Thus, there currently exist deficiencies associated with the prevention of diaper rash, and, in particular, with a food cooling apparatus.

SUMMARY OF THE INVENTION

Accordingly, one aspect of the present invention is to provide a food cooling apparatus, including a generally pear shaped housing having a bottom portion connected to a middle portion tapering to a top portion, an electric fan connected to an interior wall of the generally pear shaped housing and operative to draw air into an air inlet and out an air outlet, and a rechargeable battery supported within the bottom portion. A connector portion extends downward from the bottom portion and is operably configured to attach to an external surface. The generally pear shaped housing has a generally hollow interior with the air inlet located on the middle portion and the air outlet located on the top portion. The air outlet is generally perpendicular to the generally pear shaped housing in an upright position. The electric fan is not visible from the outside of the generally pear shaped housing. The rechargeable battery operationally providing power to the electric fan. The lower portion has a greater mass than the middle and top portions such that the center of gravity of the generally pear shaped housing is lowered.

Another aspect of the present invention is to provide a food cooling apparatus, including a housing having a bottom portion connected to a middle portion tapering to a top portion, an electric fan connected to an interior wall of the housing and operative to draw air into an air inlet and out an air outlet, and a rechargeable battery supported within the bottom portion. A connector portion extends downward from the bottom portion and is operably configured to attach to an external surface. The housing has a generally hollow interior with the air inlet located on the bottom portion and the air outlet located on the top portion. The air outlet is generally perpendicular to the housing in an upright position. The electric fan is not visible from the outside of the housing. The rechargeable battery operationally providing power to the electric fan. The lower portion has a greater mass than the middle and top portions such that the center of gravity of the housing is lowered.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Figure 1A:
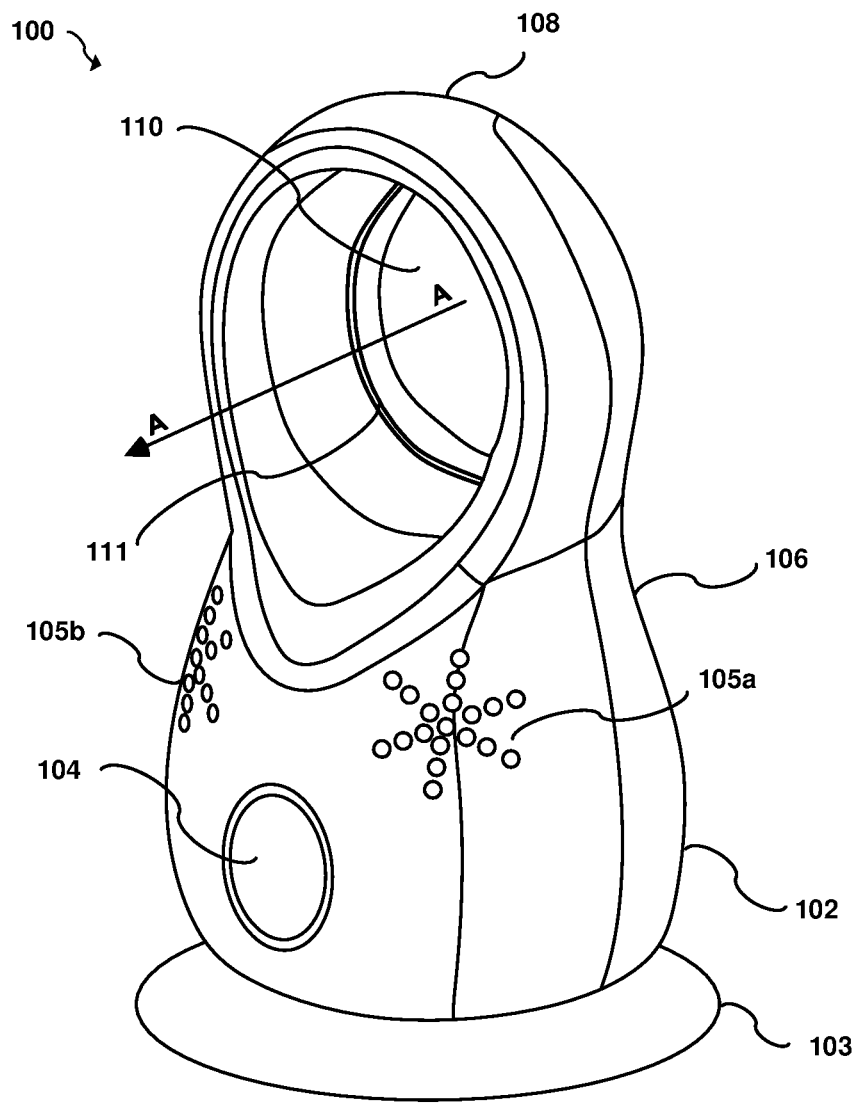
FIG. 1A is a perspective view of a food cooling apparatus in accordance with an embodiment of the present invention.
Figure 1B:
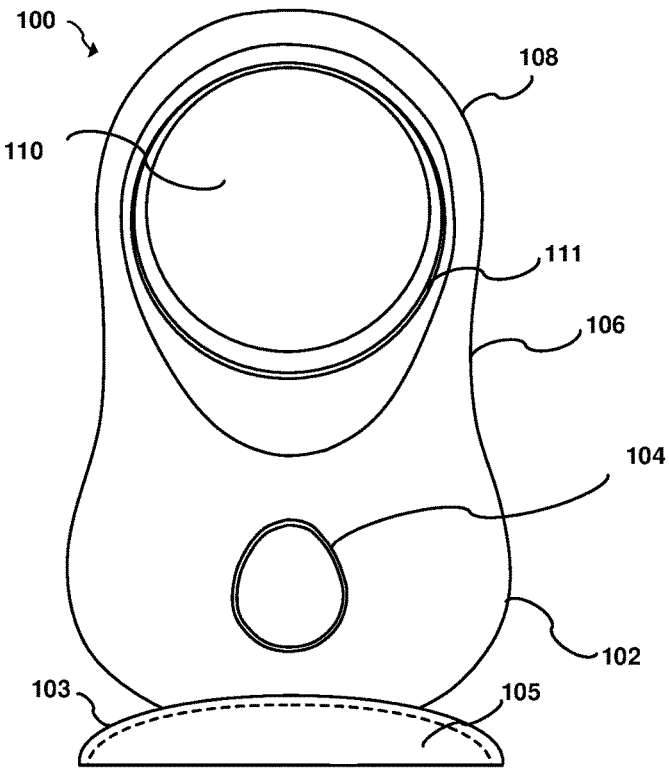
FIG. 1B is a front view of the food cooling apparatus shown in FIG. 1A.
Figure 1C:
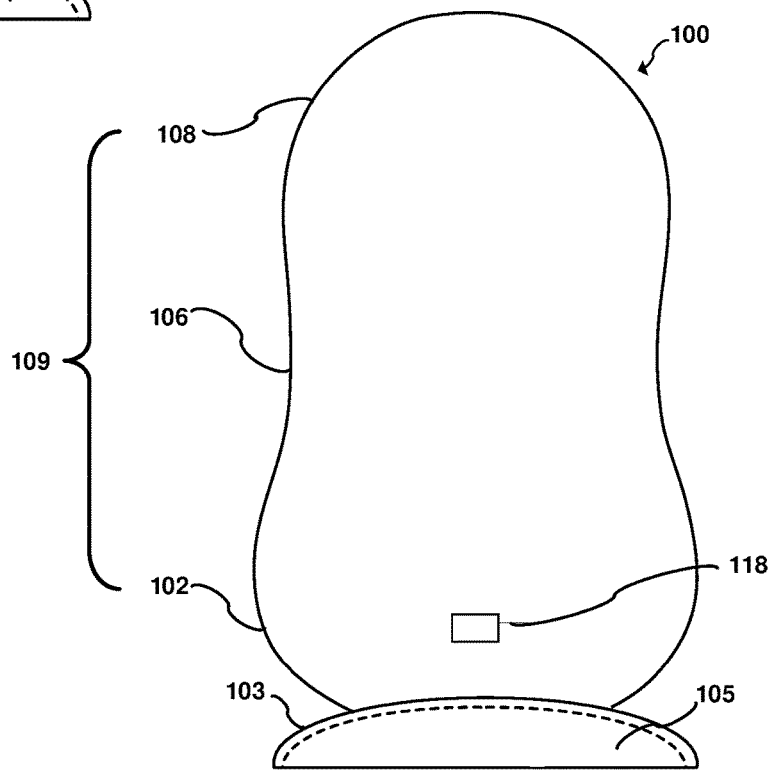
FIG. 1C is a rear view of the food cooling apparatus shown in FIG. 1A.
Figure 1D:
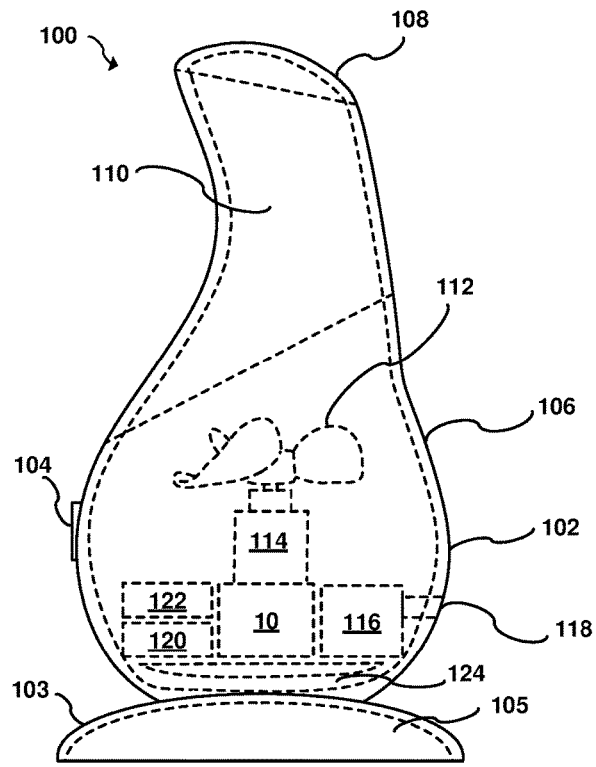
FIG. 1D is a side view of the food cooling apparatus shown in FIG. 1A.
Figure 1E:
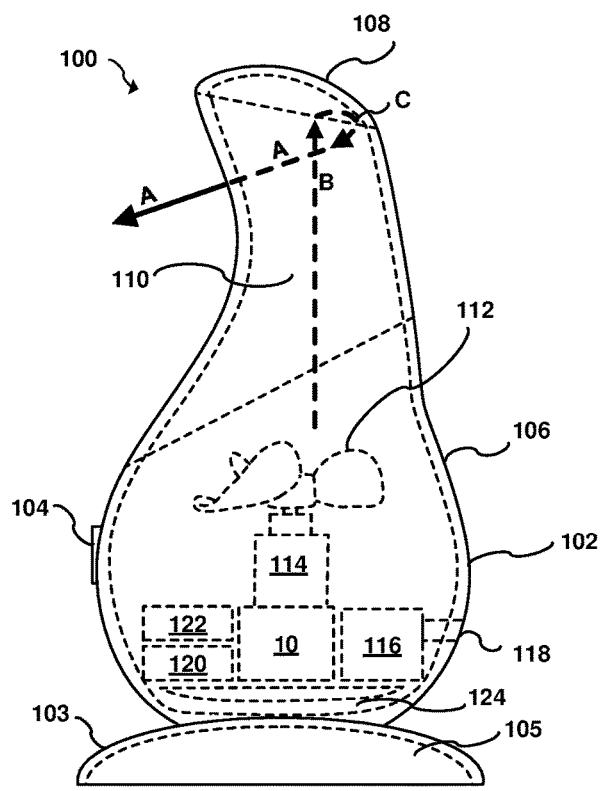
FIG. 1E is a side view of the food cooling apparatus shown in FIG. 1A illustrating the airflow therein.
Figure 1F:
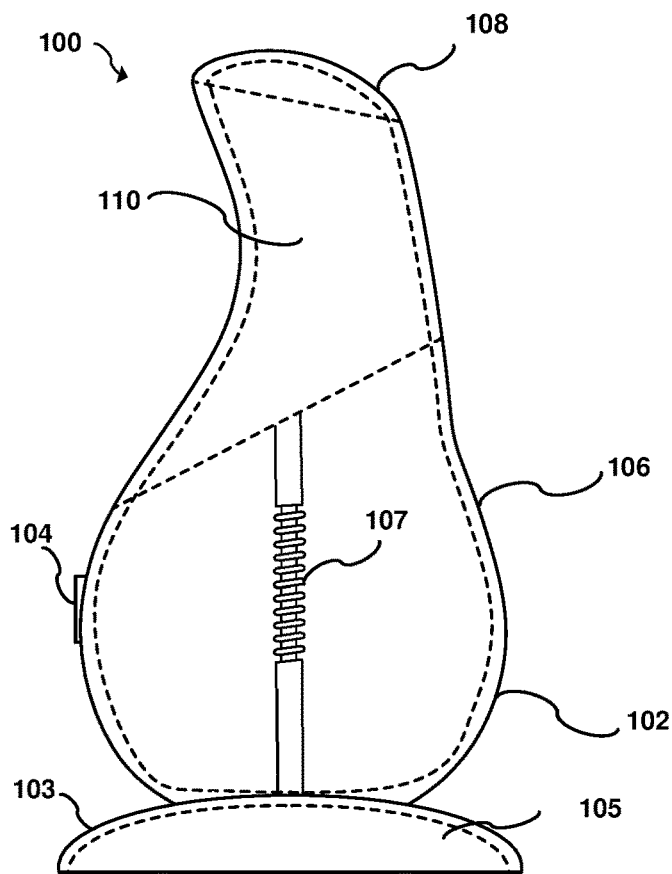
FIG. 1F is a side view of the food cooling apparatus illustrating an optional mandrel bending skeleton.
Figure 1G:
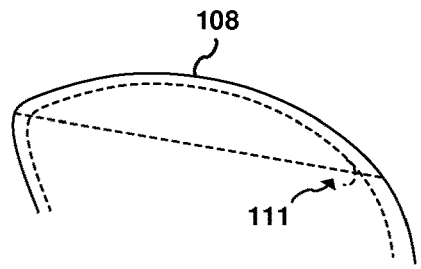
FIGS. 1G and 1H are zoomed in portion of side view of the food cooling apparatus shown in FIG. 1A illustrating respectively a small opening encircling a top rear interior wall and the airflow flowing there thru.
Figure 1H:
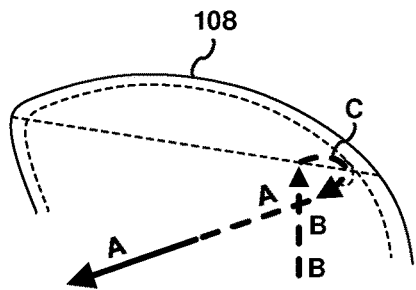
Figure 1I:
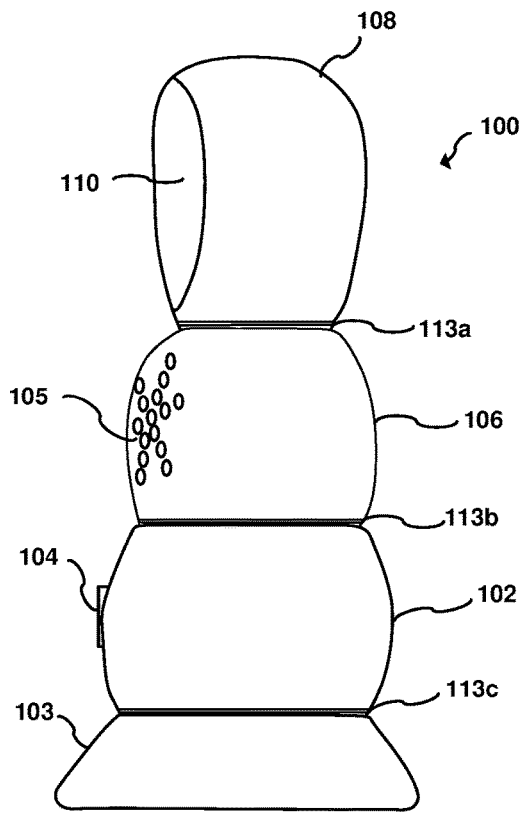
FIG. 1I is a side view of the food cooling apparatus illustrating optional mandrel bending surfaces in an operational upright position.

Referring now to the drawings, wherein like reference numerals designate identical or corresponding parts throughout the several views, preferred embodiments of the present invention are described.

The present invention provides an apparatus and system for individuals to lower the temperature of foods and other products. It includes an innovative "blade-less" or "hidden" fan housed in a bendable, posable, repositionable material that can be angled in the direction of the item to be cooled. The blades of the present invention are hidden for safety and sanitary purposes.

The present invention may be operationally used without limitation as a handheld device and/or a standing device that can be positioned down near food or other item needing cooling. According to one non-limiting implementation, the food cooling apparatus includes a "tumbler" or "roly-poly toy" like weighted bottom. As used herein, a "tumbler" or "roly-poly toy" like weighted bottom is a round-bottomed apparatus, usually egg-shaped, that tends to right itself when pushed at an angle. The apparatus may be substantially hollow with a weight inside the bottom hemisphere. The placement of this weight is such that the apparatus has a center of mass below the center of the hemisphere, so that any tilting raises the center of mass. When such an apparatus is pushed over, it wobbles for a few moments while it seeks the upright orientation, which has an equilibrium at the minimum gravitational potential energy. The exterior of the food cooling apparatus in at least one embodiment comprises a material that allows bending and adjusting at will such that the angle of the airflow can be adjusted.

Such an arrangement allows the user to easily grip the device in a preferred operational use angle. It also allows the device to be placed next to food or other item to direct air flow. If a user accidently moves the device, then the device would automatically re-correct its orientation. According to one embodiment, the present invention has interior fan blades for safety and sanitary reasons.

Referring to FIGS. 1A-1K, block diagrams illustrating a non-limiting exemplary food cooling apparatus. Food cooling apparatus 100 having a generally hollow pear shape with a larger generally elliptical bottom portion 102 connected to a middle portion 106 and tapering to a top portion 108. According to one embodiment, bottom portion 102 is operatively shaped to aid in righting the food cooling apparatus 100 when it is pushed at an angle including, without limitation, a round-bottom, an egg-shaped and the like.

The generally hollow food cooling apparatus 100 includes an interior wall having an interior embedded fan connected thereto. Top portion 108 includes outlet opening 110 and bottom portion 102 and/or middle portion 106 includes one or more inlet openings (105a and 105b). An exterior surface attachment portion 103 is arranged along the bottom portion 102 and is configured to attach to an exterior surface such as a tabletop or mat (not shown). According to an alternative arrangement, the exterior surface attachment portion 103 is detachable from the generally hollow food cooling apparatus 100. The embedded fan 112 located within the hollow interior of food cooling apparatus 100 produces an airflow stream which is directed through the hollow interior of the food cooling apparatus 100 and out outlet opening 110 such that there is an airflow stream in the direction of A-A. Referring to FIGS. 1E-1H, a non-limiting airflow within the generally hollow food cooling apparatus 100 is shown. According to this embodiment, the embedded a fan 112 located within the hollow interior of food cooling apparatus 100 produces an airflow stream which is directed through the hollow interior in the direction of B-B, is redirected by in the curved direction of C-C and out outlet opening 110 in the direction of A-A. The airflow is redirected in the curved direction of C-C by means of air pressure within the top portion 108 and a small opening 111 encircling the rear upper wall of out outlet opening 110.

According to one possible embodiment, exterior surface attachment portion 103 and includes opening 105 which is operably configured to provide suction when depressed against an exterior surface, such as, without limitation, a tabletop, plate, bowl, finger, hand and the like. The exterior surface attachment portion 103 may be composed of any lightweight flexible airtight material including, without limitation, silicone, nitrile, Viton, vinyl, urethane, thermoplastic elastomers, polypropylene and the like. However, it is understood that exterior surface attachment portion 103 may be attached to an exterior surface by other means within the scope of the present invention, including without limitation magnetic, Velcro and the like.

Although the outlet opening 110 and the inlet opening are located in respectively the top portion 108 and bottom portion 102, it is understood that other locations may be utilized without departing from scope the present invention. According to one embodiment, the inlet opening may be located in the middle portion 104. According to another embodiment, an exterior portion of the inlet opening is located in the top portion 108 and is connected to an interior channel directing the intake airflow to an interior portion of the inlet opening being located either in the bottom portion 102 or middle portion 104 such that it is positioned below the fan 112. According to yet another embodiment, outlet opening 110 is located in the bottom portion 102 and the inlet opening is located either in the top portion 108 or the middle portion 104.

According to at least one embodiment, bottom portion 102 includes a weighted portion such that the overall effect is for the food cooling apparatus 100 to have a disproportionately low center of gravity such that it will automatically right itself to an upright operating position if food cooling apparatus 100 is ever pushed or tilted over. According to one possible embodiment, the weighting portion may include one or more batteries. Middle portion 106 includes an on/off button 104. However, although the on/off button 104 is shown on the front of the middle portion 104 in FIGS. 1A, 1B, 1D, 1E and 2, it is understood that the on/off button 104 may be located anywhere on the housing within the scope of the present invention.

Bottom portion 102, middle portion 106 and top portion 108 (collectively, the external surfaces 109) of the food cooling apparatus 100 in at least one preferred embodiment comprises a material that allows bending and adjusting at will such that the angle of the airflow stream in the direction of A-A can be adjusted. External surfaces 109 may be composed of any lightweight bendable, posable, repositionable material including, without limitation, silicone, nitrile, Viton, vinyl, urethane, thermoplastic elastomers, polypropylene and the like that can be repositioned as needed to change the angle of airflow in the direction of an item. The food cooling apparatus 100 include, without limitation, wire, springs, flexible metal tubing or other metallic material therein to help with adjustable positioning of food cooling apparatus 100.

External surfaces 109 may be without limitation, flexible, solid, inflatable and the like. Bottom portion 102 and/or middle portion 106 includes, without limitation, a fan 112 connected to a motor 114, a computing environment 10, and a rechargeable battery 116. Importantly, fan 112 is positioned such that it is out of reach of a user which is an essential element in order for the present invention to be safe and for sanitary purposes. Computing environment 10 includes, without limitation, a processing unit 12, memory 14, one or more communication connections 16, one or more input devices 18, one or more output devices 20, and storage 22.

On/off button 104 is configured to initiate or terminate rechargeable battery 116 from providing electrical power to the components requiring an electrical current to operate. Rechargeable battery 116 is connected to a power connector 118 configured to recharge rechargeable battery 116. Although the power connector 118 is shown on the rear of the bottom portion 102 in FIG. 1C, it is understood that the power connector 118 may be located on the side of the bottom portion 102 or anywhere else on the housing within the scope of the present invention. According to an optional embodiment, the initiation or termination of rechargeable battery 116 providing electrical power may be controlled remotely from an external Bluetooth compatible device, such, as without limitation, a PDA, a computer, a cellular device, and the like.

According to at least one embodiment, the bottom portion 102 includes a weighted portion 124 operationally configured to lower the center of mass below the center of the hemisphere of the food cooling apparatus 100, so that any tilting raises the center of mass. In another embodiment, the motor 114, rechargeable battery 116, computing environment 10 are operatively positioned such that they collectively operate as a weight instead of or in addition to weighted portion 124. Weighted portion 124 may contain, without limitation, sand, any granular material, or any other weight providing material such that the overall effect is for the food cooling apparatus 100 to have a disproportionately low center of gravity such that it will automatically right itself to an upright operating position if the food cooling apparatus 100 is ever pushed or tilted over.

Figure 1J:
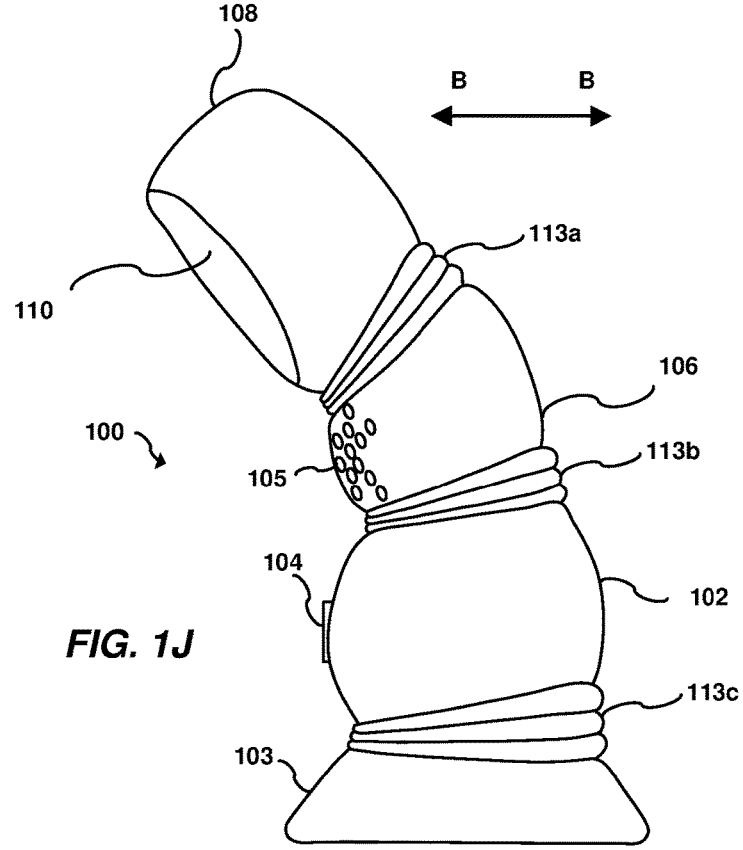
FIG. 1J is a side view of the food cooling apparatus illustrating optional mandrel bending surfaces in an operational angled position.
Figure 1K:
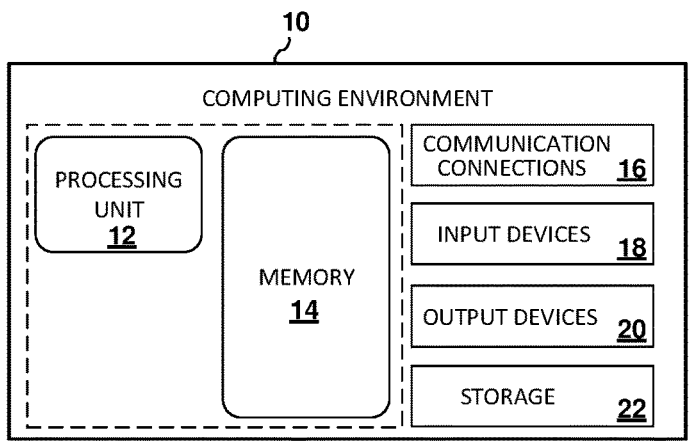
FIG. 1K is a block diagram illustrating the computing environment of the food cooling apparatus shown in FIG. 1A.

According to an optional embodiment shown in FIGS. 11 and 1J, mandrel bending portions (113a-113c) may be configured between bottom portion 102, middle portion 106 and top portion 108 such that the food cooling apparatus 100 may be angled generally without limitation in the direction of B-B. Mandrel bending portions (113a-113c) may comprise without limitation, thermoplastic rubbers, elastomers, other soft plastics, polypropylene and the like. However, it is understood that any material that is flexible, collapsible and/or extendable, may be used within the scope of the present invention. According to another optional embodiment shown in FIG. 1F, mandrel bending may be configured by means of a mandrel bending skeleton 107 interior to the food cooling apparatus 100. However, it is understood that the bendable nature of the present invention may be accomplished by any known means, including without limitation, mandrel bending and the like, and at any position along the food cooling apparatus 100.

According to an alternate embodiment, bottom portion 102, middle portion 106 and/or top portion 108 are sheer enough for light to pass therethrough. In this embodiment, a light 122 is utilized such that the food cooling apparatus may be configured to provide lighting. Light 122 may be comprised of, without limitation, a light-emitting diode "LED", surface mounted diodes, a flexible LED chain, a fluorescent bulb, an incandescent bulb and the like. It is understood that light 122 may comprise any possible light providing source within the scope of the invention. According to an alternative embodiment, on/off button may also be illuminated for ease of use by the care giver.

According to another alternative embodiment, food cooling apparatus 100 includes a thermometer 120 configured to display a temperature of an item in an operational use. Without limitation, the current temperature and temperature change may be indicated on an optional display (not shown) on the exterior or the present invention. Optionally, the present invention may be connected to a Bluetooth receiver or the like (communications connection 16) to display temperature related information an external Bluetooth compatible device, such, as without limitation, a PDA, a computer, a cellular device, an audio component and the like. Temperature change may be indicated by inclusion or leuco dyes withing material and other color changing plastic.

According to another alternative embodiment, food cooling apparatus 100 includes a heating element configured in coordination with fan 112 to such a heated airflow stream is produced in the direction of A-A. Thereby, the present invention may be used not only to cool items but also to heat them.

According to yet another alternative embodiment, food cooling apparatus 100 includes a proximity sensor (not shown) that may activate the airflow when triggered by spatial proximity to the food, eating utensil or other item.

Figure 2:
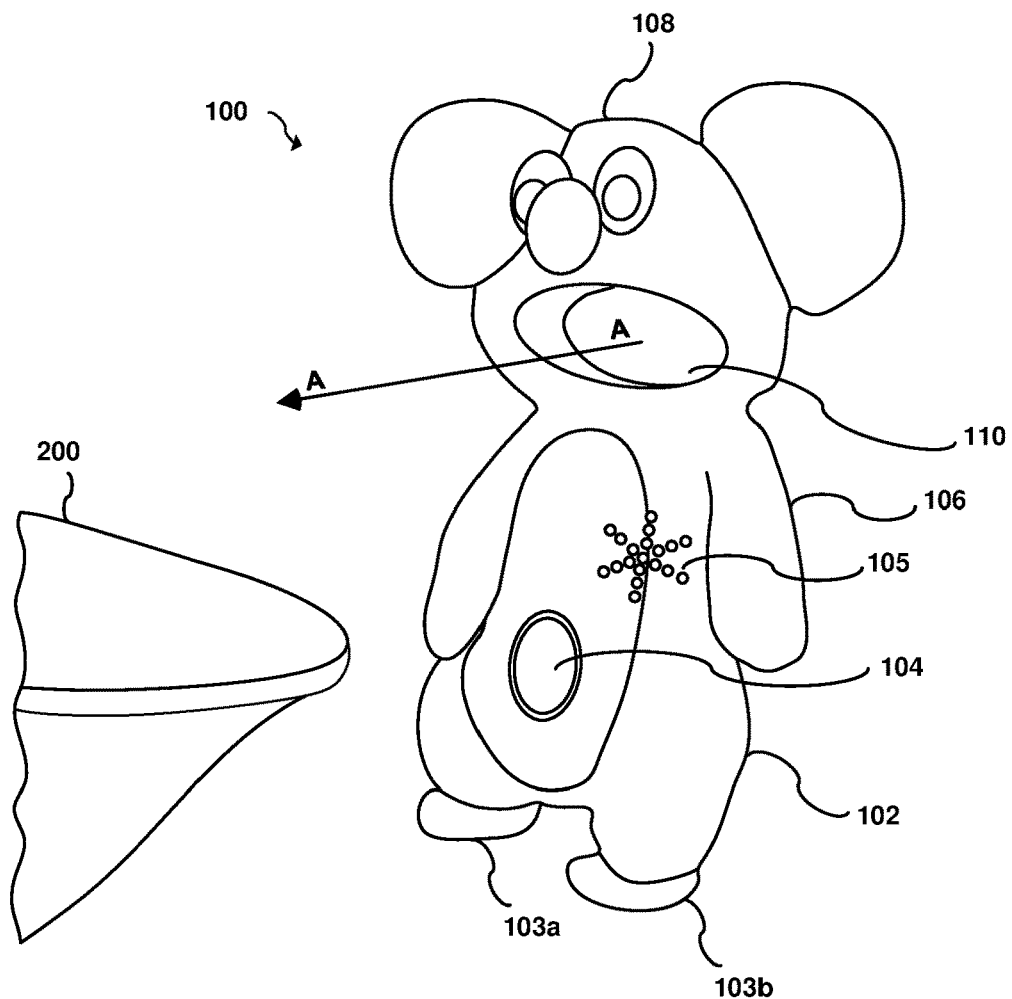
FIG. 2 is a perspective view of a food cooling apparatus in accordance with an alternative embodiment of the present invention.

Referring to FIG. 2, a perspective view of a food cooling apparatus in accordance with an alternative embodiment of the present invention is shown. According to this alternative embodiment, the external shape of the food cooling apparatus is a playful and decorative shape including without limitation, a teddy bear and the like. The generally hollow food cooling apparatus 100 includes an interior wall having an interior embedded fan connected thereto. Top portion 108 includes outlet opening 110 and bottom portion 102 includes an inlet opening (not shown). Exterior surface attachment portions 103a and 103b are arranged along the bottom portion 102 and are configured to attach to an exterior surface such as a tabletop or mat (not shown). An embedded fan is located within the hollow interior of food cooling apparatus 100 produces an airflow stream which is directed through the hollow interior of the food cooling apparatus 100 and out outlet opening 110 such that there is an airflow stream in the direction of A-A. FIG. 2 shows this alternative embodiment next to bowl 200 in an operative configuration.

Although the present invention is described herein for use in cooling food temperature, it is understood that there is no limitation with respect to its use. In particular, it is understood that a food cooling apparatus may be utilized for use with an elderly adult or anyone else.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, portions of the invention may be embodied as a method, device, or computer program product. Accordingly, portions of the present invention may take the form of an entirely hardware embodiment or an embodiment combining software and hardware aspects all generally referred to as a "circuit" or "module." The present invention includes a computer program product which may be hosted on a computer-usable storage medium having computer-usable program code embodied in the medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Computer program code for carrying out operations of the present invention may be written in any programming language including without limitation, object-oriented programming languages such as Java®, Smalltalk, C#or C++, conventional procedural programming languages such as the "C" programming language, visually oriented programming environments such as Visual Basic, and the like.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A food cooling apparatus comprising:
   a generally pear shaped housing having a bottom portion connected to a middle portion tapering to a top portion, wherein the generally pear shaped housing has a generally hollow interior with an air inlet located on the middle portion or the bottom portion and an air outlet located on the top portion, wherein the air outlet is generally perpendicular to the generally pear shaped housing in an upright position;
   a connector portion extends downward from the bottom portion and is operably configured to attach to and detach from an external surface;
   an electric fan connected to an interior wall of the generally pear shaped housing and operative to draw air into the air inlet and out the air outlet, wherein the electric fan is not visible from the outside of the generally pear shaped housing;
   a rechargeable battery supported within the housing, the rechargeable battery operationally providing power to the electric fan;
   and wherein the lower portion has a greater mass than the middle and top portions.

2. The apparatus of claim 1, wherein the connector portion has a generally hollow interior with an air inlet located on the bottom of the connector portion and is operably configured when depressed to attach to the external surface using suction.

3. The apparatus of claim 1, wherein the connector portion includes Velcro on the bottom of the connector portion configured to attach to the external surface.

4. The apparatus of claim 2, wherein a center of gravity of the generally pear shaped housing causes the generally pear shaped housing to automatically come to rest in an upright position when oriented in a non-upright position.

5. The apparatus of claim 4, wherein the generally pear shaped housing comprises a molded plastic material.

6. The apparatus of claim 4, wherein at least a portion of the generally pear shaped housing comprises a fabric.

7. The apparatus of claim 4, wherein the generally pear shaped housing comprises an inflatable material.

8. The apparatus of claim 4, further comprising a proximity sensor operationally configured to engage and activate airflow when triggered by spatial proximity to an exterior object.

9. The apparatus of claim 4, further comprising a temperature sensor operationally configured to provide a user with a temperature associated with an exterior object.

10. A food cooling apparatus comprising:
    a housing having a bottom portion connected to a middle portion tapering to a top portion, wherein the housing has a generally hollow interior with an air inlet located on the middle portion or the bottom portion and an air outlet located on the top portion perpendicular to the housing in an upright position;
    a connector portion or portions extend from the top, middle, or bottom portions and is operably configured to attach to and detach from an external surface;
    an electric fan connected to an interior wall of the housing and operative to draw air into the air inlet and out the air outlet, wherein the electric fan is not visible from the outside of the housing;
    a rechargeable battery supported within the housing, the rechargeable battery operationally providing power to the electric fan; and
    flexible portions between each of the connector portion or portions, the bottom portion, the middle portion, and the top portion configured to allow angle changes between the respective portions.

11. The apparatus of claim 10, wherein the connector portion or portions are operably configured when depressed to attach to external surfaces using suction.

12. The apparatus of claim 10, wherein the connector portion includes Velcro on the bottom of the connector portion configured to attach to the external surface.

13. The apparatus of claim 11, wherein a center of gravity of the housing causes the housing to automatically come to rest in the upright position when oriented in a nonupright position.

14. The apparatus of claim 13, wherein the housing comprises a molded plastic material.

15. The apparatus of claim 13, wherein at least a portion of the housing comprises a fabric.

16. The apparatus of claim 11, wherein the connector portion is detachable from the housing.

17. The apparatus of claim 13, further comprising a proximity sensor operationally configured to engage and activate airflow when triggered by spatial proximity to an exterior object.

18. The apparatus of claim 13, further comprising a temperature sensor operationally configured to provide a user with a temperature associated with an exterior object.

19. The apparatus of claim 13, wherein the flexible portions are configured to reposition an angle of the apparatus from the upright portion to a forward portion.

\* \* \* \* \*